(12) United States Patent
Jensen

(10) Patent No.: US 6,496,697 B2
(45) Date of Patent: *Dec. 17, 2002

(54) METHOD TO MEASURE AND CHARACTERIZE INTERFERENCE THROUGHOUT A CELLULAR SYSTEM

(75) Inventor: Eric Jensen, Herndon, VA (US)

(73) Assignee: ScoreBoard, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/879,373

(22) Filed: Jun. 12, 2001

(65) Prior Publication Data

US 2002/0022479 A1 Feb. 21, 2002

Related U.S. Application Data

(62) Division of application No. 08/887,101, filed on Jul. 2, 1997.

(51) Int. Cl.⁷ .................................. H04B 15/00
(52) U.S. Cl. .................. 455/447; 455/446; 455/63; 455/67.7; 455/33.1; 455/33.4
(58) Field of Search .......................... 455/446, 447, 455/423, 450, 524–525, 33.1, 33.4, 39.1, 62–63, 67.1, 134–135, 67.7, 67.3, 226.3, 226.4, 226.2

(56) References Cited

U.S. PATENT DOCUMENTS

| | | | | |
|---|---|---|---|---|
| 5,095,500 A | * | 3/1992 | Tayloe et al. | 379/32.01 |
| 5,179,722 A | * | 1/1993 | Gunmar et al. | 455/422 |
| 5,666,651 A | * | 9/1997 | Wang | 455/450 |
| 5,926,762 A | * | 7/1999 | Arpee et al. | 455/447 |

FOREIGN PATENT DOCUMENTS

| | | | | |
|---|---|---|---|---|
| GB | 2269298 | * | 2/1994 | H04B/7/26 |

* cited by examiner

*Primary Examiner*—Daniel Hunter
*Assistant Examiner*—Pablo N Tran
(74) *Attorney, Agent, or Firm*—ZITO tlp; Joseph J. Zito; Kendal M. Sheets

(57) ABSTRACT

A computer implemented process compares signals communicated between a known position and a plurality of base stations in a cellular telephone system to determine the level of interference with a signal on a channel expected to serve the known position, and determines a value indicating a probability of interference with a signal on a channel expected to serve the known position.

4 Claims, 5 Drawing Sheets

METHOD TO MEASURE AND CHARACTERIZE INTERFERENCE THROUGHOUT A CELLULAR SYSTEM

This is a division of application Ser. No. 08/887,101, filed Jul. 2, 1997.

BACKGROUND OF THE INVENTION

1. Field of the Invention

This invention relates to cellular telephone systems and, more particularly, to processes for designing and improving the performance of cellular telephone systems.

2. History of the Prior Art

Presently available commercial mobile communication systems typically include a plurality of fixed base stations (cells) each of which transmits signals to and receives signals from mobile units within its communication area. Each base station is assigned a plurality of channels over which it can communicate with mobile units. A mobile unit within range of the base station communicates with the external world through the base station using these channels. Typically, the channels used by a base station are separated from one another sufficiently that signals on any channel do not interfere with signals on another channel used by that base station. To accomplish this, an operator typically allots to a base station a group of channels which are each widely separated from the next. So long as a mobile unit is within the area in which the signal from a base station is strong enough and is communicating with only that base station, there is no interference with the communication.

In order to allow mobile units to transmit and receive telephone communications as the units travel over a wide geographic area, each cell is normally physically positioned so that its area of coverage is adjacent to and overlaps the areas of coverage of a number of other cells. When a mobile unit moves from an area covered by one base station to that covered by another, communication with the mobile unit is transferred (handed off from one base station to another in an area where the coverage from different cells overlaps. Because of this overlapping coverage, the channels allotted to the cells are carefully selected so that adjoining cells do not transmit or receive on the same channels. The channels used by adjoining base stations are also theoretically separated from the channels of each adjoining base station sufficiently that signals from any base station do not interfere with signals from another adjoining base station. This separation is typically accomplished by assigning a group of widely separated non-interfering channels to some central cell and then assigning other groups of widely separated non-interfering channels to the cells surrounding that central cell using a pattern which does not reuse the same channels for the cells surrounding the central cell. The pattern of channel assignments continues similarly in the other cells adjoining the first group of cells. The pattern is often called a channel reuse pattern. So long as a mobile unit is within the area in which the signal from a base station is strong enough and is communicating with only that base station, there is no interference with the communications. However, when a mobile unit moves from an area covered by one base station to that covered by another base station, the communication must be transferred from one base station to the other in an area. This requires cell coverage to overlap. Because of this overlapping coverage, the channels allotted to the cells are carefully selected so that adjoining cells do not transmit or receive on the same channels. There are a number of different types of mobile communications systems. Channels are defined in different manners in each of the different systems. In the most prevalent American Mobile Phone System (AMPS) system, channels are defined by frequency. A frequency band of 25 MHz providing approximately four hundred different adjoining FM frequency channels is allotted by the federal government to each cellular operator. In a typical AMPS system, each channel uses a fixed FM frequency band width of 30 KHz. for downlink transmission from a base station to a mobile unit and another fixed FM frequency band width of 30 KHz. For uplink transmission from a mobile unit to a cell. Typically, the frequencies assigned to the downlink transmissions for an entire cellular system immediately adjoin one another and are widely separated from the frequencies assigned to the uplink transmissions which also immediately adjoin one another. In this specification, even though widely separated, the pair of frequencies used for both downlink and uplink transmission are generally intended when reference is made to an AMPS channel unless the context indicates otherwise.

Since channels are defined by frequency in an AMPS system, the channels used by any single base station are separated from one another in frequency sufficiently to eliminate interference between those channels. An operator typically allots a base station a set of channels with frequencies which are each separated from the next by some large number (e.g., twenty-one) channels carrying intermediate frequencies. Thus, in a system with twenty-one channel separation, one base station might use channels 1, 22, 43, 64, 85, and so on up to a total of between five and one hundred individual channels.

When a mobile unit moves from an area covered by one base station to that covered by another base station in an AMPS system, the communication must be transferred from one base station to the other in an area in which cell coverage overlaps. Because of this overlapping coverage, the channels allotted to the cells are carefully selected so that adjoining cells do not transmit or receive on the same frequencies. This is typically accomplished by assigning channels to a central cell which are widely separated in frequency in the manner described above, and then assigning channels to the cells surrounding that central cell using a pattern which increases each channel number by one for each sequential cell surrounding the central cell. Thus, if cells are arranged in a honeycomb pattern in which six cells surround a central cell using the above-described channels, a first cell adjacent to the central cell may have channels 2, 23, 44, 65, 86, and so on while a second cell adjoining the central cell may have channels 3, 24, 45, 66, 87, and so on. The pattern of channel assignments continues similarly in the other cells adjoining the central cell.

In some AMPS systems, especially those with cells in urban areas carrying heavy traffic, each cell may be further divided into two or three sectors each of which may include channels having the above-described frequency allotment of channels. The antennas of each sector are typically arranged to provide 180 or 120 degree coverage. When cells are discussed herein, sectors are normally meant as well unless the context indicates otherwise.

Another type of mobile system called Code Division Multiple Access (CDMA) uses digital signals to transmit data. All of the base stations of a CDMA system use the same "spread spectrum" frequency band of 1.25 megacycles to transmit the digital signals. The transmissions are combined with redundant channel coding information to allow error correction. The encoded signals are then multiplied by one of sixty-four Walsh codes which establish individual channels and increase the bandwidth to 1.25 megacycles. Because of the redundancy of the encoded signals, a receiver may decode a signal from the plethora of coded channels carrying data on the broad frequency band. Since the Walsh codes establish a number of individual channels and the pseudo-noise code assigned to each base station differs from those of other surrounding base stations, adjacent and remote cells may reuse the same frequency bands.

In another common type of mobile system called Time Division Multiple Access (TDMA), frequencies are assigned to the entire system in groups much like they are assigned in an AMPS system. However, within any frequency, each base station sends and receives in bursts during some number of different intervals or time slots. These time intervals within frequency bands then effectively constitute the individual channels. By assuring that the group of frequencies assigned to any individual base station differ from one another and from the frequencies assigned to base stations surrounding each individual base station, a channel reuse pattern is established which allows substantially greater use of the frequency spectrum because of the time division process. In theory, these forms of cell arrangement and channel assignments allows channel reuse patterns to be repeated at distances separated sufficiently to negate interference between mobile units on the same and adjacent channels.

Unfortunately, interference does occur for a number reasons. Antenna patterns, power levels, scattering, and wave diffraction differ from cell to cell. Buildings, various other structures, hills, mountains, foliage, and other physical objects cause signal strength to vary over the region covered by a cell. Consequently, the boundaries at which the signal strength of a channel falls below a level sufficient to support communications with a mobile unit vary widely within a cell and from cell to cell. For this reason, cells adjacent one another do not, in fact, typically form the precise geometric boundaries suggested above. Since cell boundaries must overlap to provide complete coverage of an area and allow handoff and because the boundaries of cells are imprecisely defined, signals will often interfere with one another even though they are generated by cells which are at distances theoretically sufficient to eliminate interference. This is especially true when a sectored cell pattern is used because the cells are much closer to one another than in a simple cell pattern.

A first signal on a channel from a remote cell interferes with a second (usually) stronger signal carrying a mobile transmission on the same channel within the coverage area of a cell when the drop in strength of the first signal from the second signal is less than some threshold level (typically measured in decibels). A signal from another cell on a channel at a frequency adjacent the frequency of a channel carrying a mobile transmission interferes when the drop in strength of the interfering signal from the serving signal is less than some second threshold level. The values are determined by the particular type of mobile system involved. For example, in an AMPS system, a signal on the same channel (co-channel) from a remote base station interferes with a desired carrier signal if the interference level is not 18 dB lower than the desired carrier; and a signal on an adjacent channel from another base station interferes with a desired carrier signal if the interference level is not 6 dB lower than the desired carrier. For a CDMA system, an interfering signal must be more than 14 dB stronger than the carrier to obscure a carrier signal because the codes establishing the channels establish heavily redundant signals from which patterns may be extracted even though the interfering signal is stronger.

In order to determine whether interference exists, a mobile system operator typically relies on customer complaints. When customers register a sufficient number of complaints regarding communication at particular points in a system, an operator will usually conduct a relatively expensive field test of the suspected portion of the system to measure carrier signals and interference received. During the test, the portion of the system in which the tests are conducted is essentially disabled. Because of the expense and inconvenience, the tests are typically limited only to the suspected area. Because such tests are limited to determining the interference at those points at which a system operator expects to find interference, the efficacy of these tests is very suspect.

The tests provide data from which the points at which channels from different cells actually interfere with one another may be determined. If the level of interference is sufficiently large, the operator may change the channel group assigned to the particular area. That is, the frequency group assigned to a cell (or cells) may be changed in its entirety to another frequency group in which channels which would interfere with channels carried by other cells do not exist. It is also possible to eliminate some interference by changing cell characteristics (such as antenna tilt or power used in particular cells) without changing the channels used. Once channels have been assigned to cells which provide acceptable coverage and detected interference has been eliminated, the system is fixed and operated until other complaints arise.

A major problem with the process is that it does not provide a complete understanding of interference which actually exists in a system since typically only those positions at which extensive interference has been reported are tested for actual interference. The process does not take into consideration all of the possible signals which might be propagating into the affected area to interfere with the carrier nor does it take into consideration the effects which a change in channel assignments may have in other areas of the system. Often (and possibly usually) this method of curing interference merely exports the interference to another portion of the system where it is only discovered when a sufficient number of complaints arise to warrant a field test of the newly isolated area of interference.

Moreover, this method of placing cells, assigning frequencies, and eliminating interference is quite slow and labor intensive. Testing a medium sized system may require as much as 400 man hours. The process greatly increases the costs of creating and maintaining mobile systems without guaranteeing that interference will be eliminated. Because of the emerging nature of the market for cellular telephones, system changes which cause interference such as traffic growth are taking place constantly and at an accelerating rate. Complicating the general problem of interference in an existing system is the fact that cellular system operators are presently installing new CDMA and TDMA systems because they allow a greater number of mobile units to utilize a system and because these digital system provides a better quality of service when they are functioning properly. Often the installation of these new systems is taking place where AMPS cellular systems already exist and will continue to exist. In general, with these systems, some of the frequencies used in the AMPS systems are removed; and a CDMA base station is positioned in place of a sector at a base station.

It is desirable to provide a process by which the quality of service provided by a cellular system (and portions thereof) may be determined in terms of fixed verifiable quantities so that changes may be made to enhance the quality of service with an expectation that the changes will have the desired result in actually improving the quality of service provided by the system.

SUMMARY OF THE INVENTION

The present invention is realized by a computer implemented process which compares signals communicated between a known position and a plurality of base stations in a cellular telephone system to determine the level of interference with a signal on a channel expected to serve the known position, and determines a value indicating a probability of interference with a signal on a channel expected to serve the known position.

In one embodiment, changes in the system to improve the interference value are implemented only if the interference value is above a certain level.

These and other features of the invention will be better understood by reference to the detailed description which follows taken together with the drawings in which like elements are referred to by like designations throughout the several views.

DETAILED DESCRIPTION

Figure 1:
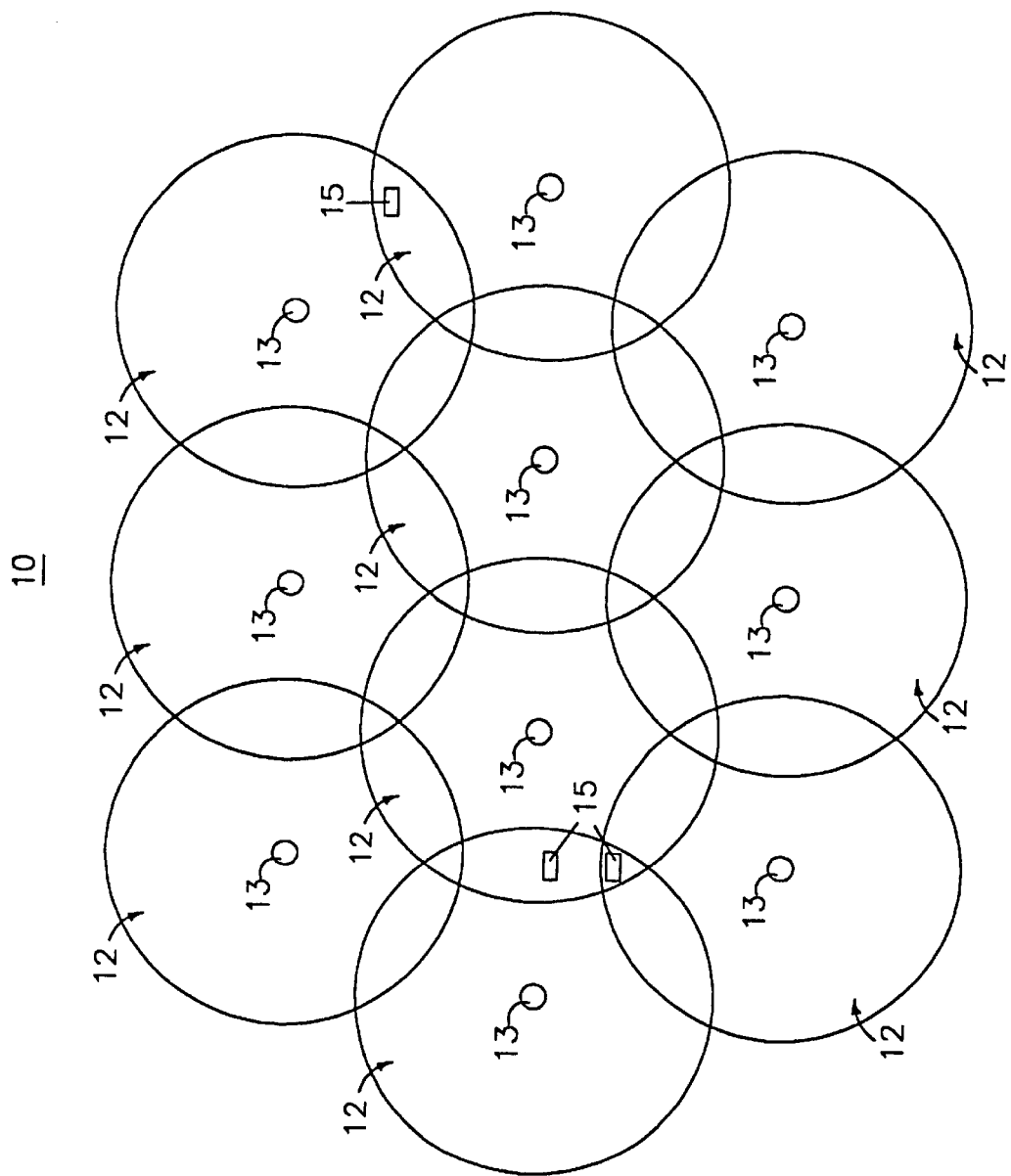
FIG. 1 is a drawing depicting an idealized mobile cellular telecommunications system.

Referring now to FIG. 1, there is illustrated a cellular telephone system which includes a number of individual cells 12 arranged in an idealistic honeycomb pattern. For the purpose of this explanation of the invention, the system 10 will be considered to be an AMPS system. This invention may be practiced, however, with any of the known cellular systems including CDMA and TDMA systems. More particularly, the signal strength data accumulated in constructing a narrow band system such as an AMPS or TDMA system may be used to construct or improve a CDMA or other wide band system. The data accumulated from an AMPS system differs from that of a CDMA system only with respect to the effect of Rayleigh fading; and the effect of Rayleigh fading cancels out with a sufficient number of redundant points of measurement. In a similar manner, the data accumulated from a CDMA system may be utilized to construct or improve an AMPS system.

In an AMPS system, each of the cells 12 includes at least one base station 13 which transmits and receives communications on a number of assigned frequencies with mobile units 15 operating within its service area. The frequencies which are chosen are separated sufficiently that signals from any single base station do not interfere with other signals from that base station. In FIG. 1, the service area of each of the ideal cells 12 is defined by an outer solid boundary which indicates the limits of the area in which the signals from that cell 12 are strong enough to serve a mobile unit 15.

As may be seen in FIG. 1, in order to allow mobile units to transmit and receive telephone communications over a wide area, the service area of each cell 12 overlaps the service areas of a number of adjacent cells 12 so that within these overlapping areas either of two or more cells 12 might serve a mobile unit 15. The channels allotted to the individual cells and the frequency reuse pattern are carefully selected so that adjoining cells do not transmit or receive on the same frequencies. Consequently, there are no overlapping areas over an entire cellular system in which signals of the same frequency are received simultaneously from more than one cell 12 by a mobile unit 15.

In some systems, cells used in areas carrying heavy traffic are further divided into two or three sectors each of which may include channels allotted as described earlier. The antennas of each three sector cell are arranged to provide 120 degree coverage. With slightly over four hundred channels available to each cellular system, this allows a repeating pattern of groups of cells in the beehive arrangement of FIG. 1 with seven cells each having three sectors each of which has approximately twenty channels.

Unfortunately, the boundaries at which the signal strength of a channel falls below a level sufficient to support communications with a mobile unit vary widely from cell to cell. For this reason, cells adjacent one another do not, in fact, typically form the precise geometric boundaries suggested above but form a boundary patterns such as those illustrated in FIG. 2.

Since it is necessary that each cell 12 (or sector of a cell 12 if the cell is divided into sectors) have sufficient power to transmit and receive signals with a mobile unit 15 in the overlapping areas of cell coverage to accomplish hand-off of a mobile unit transmission from one cell to another, it is possible that channels used by different cells will interfere with each other. As has been pointed out, channels which may interfere with one another are channels using the same frequency (co-channels) and channels on frequencies immediately adjacent to a serving channel. Thus, in assigning cell sites and establishing a reuse pattern, the operator attempts to assure that channels which might interfere with one another are not present in overlapping areas. This is relatively simple given the ideal system such as that illustrated in FIG. 1.

Figure 2:
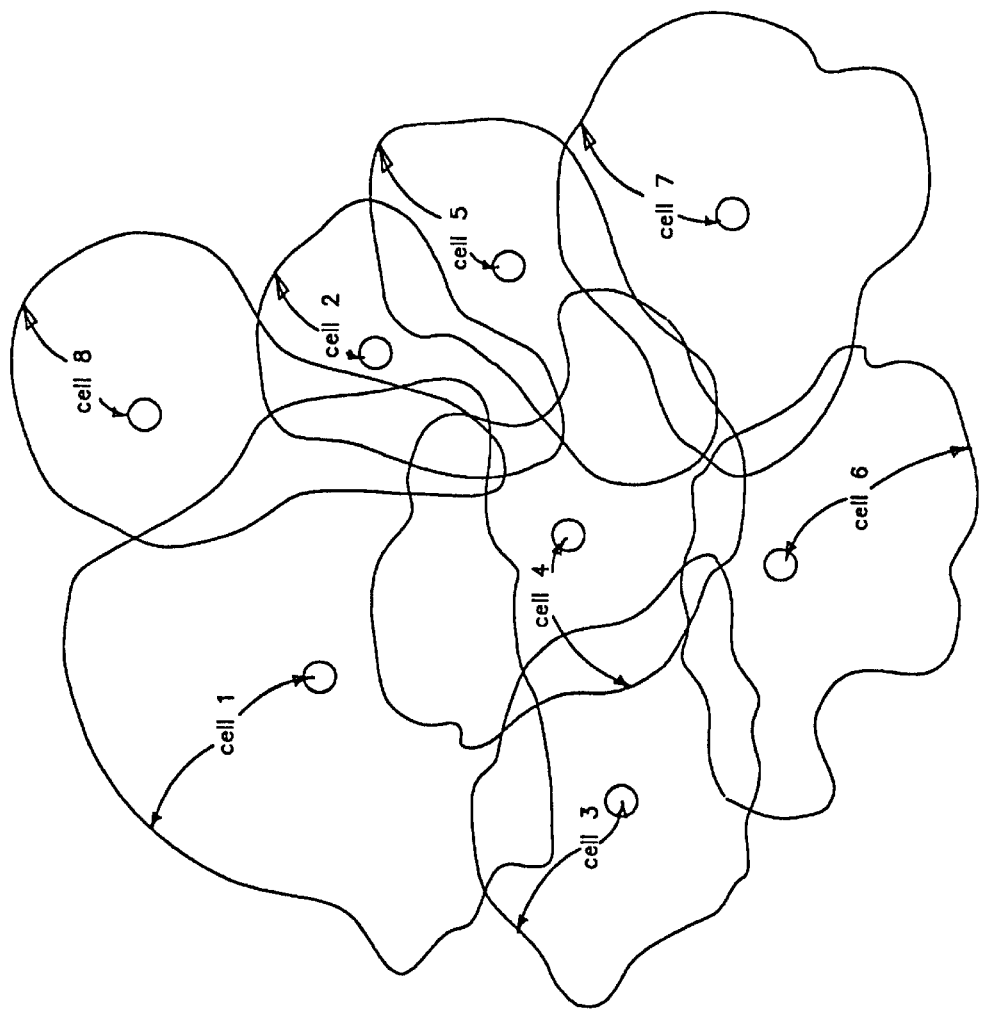
FIG. 2 is a drawing depicting a portion of a more realistic mobile cellular telecommunications system than that illustrated in FIG. 1.

However, in the more realistic system illustrated in FIG. 2, it will be seen that areas covered by different cells overlap not only where the cell sites are immediately adjacent one another but at greater distances. For example, coverage provided by cell 4 (in FIG. 2) is overlapped by coverage provided by each of adjoining cells 1, 2, 3, 5, 6, and 7. This overlap is normal and allows hand-off to occur when a mobile unit moves from the area covered by cell 4 to any of the immediately adjoining areas of coverage. However, coverage provided by cell 4 is also overlapped by non-adjoining cell 8. If the cells of FIG. 2 are divided into sectors each covering 120 degrees, then the frequencies of channels assigned to the overlapping areas in adjoining cells may cause adjacent channel interference. Moreover, because of the limited number of channels available, the sectors of cell 8 may be assigned channels which cause co-channel interference with the channels of cell 4 in a typical frequency reuse pattern. Similar interference problems exists with respect to other cells in the cellular system which are not shown in FIG. 2.

Because the coverage offered by different cells differs so drastically, a cellular system is usually established using software which predicts what signal strengths are to be expected from each of a particular set of cells. This software uses input data describing the general physical characteristics of the terrain surrounding each cellular site and the physical characteristics of the cellular station to generate estimated signal strength coverage plots for the area surrounding a cellular site. This predictive software is used to determine antenna positions which should provide optimum coverage with minimum interference in a typical system. However, since the predictive software used to establish a system presumes general characteristics derived from similar terrain and similar cells to determine cell coverage, overlap such as the overlap of cell 8 into the boundaries of cell 4 illustrated in FIG. 2 is often not predicted. In fact, it has been found that the total prediction error in comparing the strengths of the carrier signal and interference utilizing such prior art predictive software is approximately plus or minus 13.6 dB. Since a carrier signal should be 18 dB greater than an interfering signal in order to eliminate co-channel interference in an AMPS system, this is a very large discrepancy.

Once cell sites have been determined in some manner (e.g., using predictive software), the operator assigns channel groups to the cells in accordance with the technique described above, places antennas in position, and operates the system. Unless interference is suspected or immediately apparent, the operator waits for subscriber complaints to surface and then conducts physical tests at positions limited to the positions of the complaints to determine whether interference, in fact, occurs at those positions. The determination of actual interference is made by drive tests which measure signal strength of channels at the positions where interference is suspected or complaints have shown that interference has occurred within the cellular system area. Conducting signal to interference measurements is very labor intensive, so strength measurements are typically taken only at points where interference is expected. These tests may entirely miss interference which actually occurs.

If the tests show that interference is sufficiently great at the positions of the measurements, the groups of channels assigned to the cells having interfering channels may be changed. Determining whether interference is sufficiently great is accomplished by comparing at any point the level of interference to the signal level of the carrier. Acceptable levels have typically been chosen to be those described above, i.e., 18 dB for co-channel interference and 6 dB for adjacent channel interference in an AMPS system. If interference of this level is ultimately found to exist in an area which is expected to carry significant traffic, the frequency group assigned to a cell (or cells) is typically changed in its entirety to another frequency group which does not have channels which would interfere with channels carried by the surrounding cells. If this does not work, changing cell characteristics such as antenna tilt or the radiated power may eliminate interference without changing the groups of channels used. Once channels which provide acceptable coverage have been assigned to cells and the previously detected interference has been presumed to be eliminated by this method, the system is fixed and operated.

This operation is slow, labor intensive, and often does not provide a complete resolution of the problem. For example, changing frequency assignments may simply transfer interference problems unexpectedly to other areas of the system by transferring coverage such as that shown for cell 8 in FIG. 2 to unexpected areas.

A method has now been devised which overcomes the problems of the prior art by utilizing measured signal level data for an entire system to provide predictive plots which may be utilized to establish cell site positions and channel assignments. The process allows plots and channel assignments to be easily changed at minimal cost whenever a system undergoes change.

In one embodiment, the process begins with a drive test of the entire system area. In the drive test for this embodiment, each cell and sector transmits on a single channel different than any channel used for transmission by any other cell or sector in the area. In general, signals on all channels transmitted from any one cell are, on an average, received at the same strength at any given point in the service area so long as the frequencies of the channels are within approximately ten percent of each other. Thus, whatever channel a cell transmits on during the tests, the received signal strength will be the same for signals transmitted on any other channel from that cell.

If an entirely new system is being designed, expected cell sites may be selected in any of a number of different ways such as by use of prior art predictive plotting software; and then test transceivers may be placed at the proposed cell site positions. If a cellular system already exists, then the cell sites which exist are used along with any proposed new cell sites. A mobile unit with a scanning receiver drives over all of the roads and highways of the entire system. The mobile scanning receiver constantly scans and measures the strength (usually received signal power) of each test channel transmitted from each of the cell sites as the mobile unit moves. The mobile unit also includes equipment (such as Loran or Global Positioning System (GPS) equipment) which constantly records the position of the mobile unit as each set of strength measurements is taken. This provides strength measurements of frequencies generated by transmitters at all of the cell sites proposed to be included in the system which can be received at each point in the service area over which the mobile unit drives. By transmitting from each cell on a single different channel, the cell which is transmitting any signal received at any point by the mobile unit is positively known. As the test continues, the signal strength measurements of all signals received (or all signals greater than a certain level) are recorded in a database by equipment in the mobile unit together with the position at which the signals were received.

It should be noted that certain interference, typically Rayleigh fading, is essentially intermittent in nature. Such interference tends to strengthen and weaken received signal strength over very short distances. In order to eliminate the effect of this intermittent fading, readings may be taken at a number of positions quite close together and later averaged in order to provide quite an accurate representation of the strength of signals received at any point. In one embodiment, each data sample is combined with other data samples within one hundred feet of each other to eliminate the intermittent effects and normalize samples taken during different test drives. Since Rayleigh fading is the primary difference between received signal strengths in different types of mobile systems, the data gathered from tests conducted in narrow band systems may be used in the design or improvement of wideband systems.

The frequency of each piece of signal strength data in the database is then related to the test channel being transmitted by each cell and sector during the test. This generates a database which indicates the cell and sector from which each signal received by the mobile unit was sent. The cellular strength data base thus includes actual, rather than projected, received signal strengths at each point in the test area for signals transmitted from each cell.

It should be noted that the signal strength data for an area can be compiled from more than a single drive test. In such a case, the data from all of the drive tests must be combined so that the data of each drive test matches that of other drive tests. Thus, for example, if higher transmission power was used in one drive test than in another, then the strength values should be scaled to provide data having the same significance. The data collected from one drive test may also be "combined" with previously collected data from other drive tests if the new data represents only a portion of the cells in the network. Of course, if data is already available from previous wide area test drives, then this data may be used and no test drives need be conducted. This step is useful when adding new cells to a network so that the effect of new cells may be determined without having to re-collect data for the entire network.

A second method of collecting signal strength data provides substantial economies over the method explained above, especially when new sites are being planned and a particular site has not yet been selected. Tests have shown that the signal strength received at a cell site from the mobile transmitter in an uplink transmission is on an average the same as the signal strength which would be received at a mobile unit from a cell site in a downlink transmission. If the uplink and downlink signal strengths differ, comparable values may be obtained by adjusting the amplifications and power values. Thus, rather than conducting drive tests with transmitters placed at each proposed cell site as in the first method and checking each against the other, drive tests are conducted by placing a single transmitter in a mobile unit and using fixed receivers (rather than expensive scanning receivers) at all of the proposed positions at each of the sites over an area for which new cells are proposed. The mobile unit drives over the roads encompassed by the new cells transmitting on a single frequency while all of the receivers attempt to detect the transmission. The power level transmitted by the mobile antenna is measured at the mobile unit, and a positioning system is linked to the mobile unit to provide position indications at each point of measurement. The mobile transmitter sends a signal at the selected frequency, and the receivers at all of the cells measure its strength. The position of the mobile unit for each of the test transmissions is recorded with the times of the transmissions in a database. The signal strength received at each proposed site and the times of reception are recorded by each receiver. Since the signal strength received at a cell site from the mobile transmitter in an uplink transmission is on an average the same as the signal strength which would be received at a mobile unit from a cell site in a downlink transmission (or may be adjusted to be so), the data gathered by the drive test using this second method may be directly substituted for the data gathered in the drive tests for the previous method.

Once the data is available, however it has been collected, the process compares the data for each channel received at each point in the entire area with the data for all other channels received at the point to determine at any point which cells should serve the point. These cells are called "likely servers." A number of criteria may be used.

In general, a cell is a likely server at a particular location if there is a non-trivial probability that a cell will provide a transmission path to or "serve" a mobile unit at that location. Different methods may be used to determine likely servers. A basic method identifies as likely servers all cells that serve a location with a signal strength within 3 dB (or some other value depending on the system) of the strongest signal strength for that location. More sophisticated methods may account for signal path imbalances, may balance the uplink and downlink strengths where they vary, may bias certain strength determinations in favor of particular cells, or provide other adjustments to match the particular area of the system. The method may also account for each different type of network hardware and network configuration and control information (e.g. how mobile unit hand-off is performed) to determine likely servers for each location.

Using the basic method, the cell providing the strongest signal at a point is typically designated the cell to serve that point because signals on any channel on which the cell transmits will be received at approximately the same signal strength. Signals on other channels received at the same point but at lesser strengths still within the 3 dB. range typically are transmitted by adjoining cells in what constitutes a hand-off (overlap) area for that point. The service area for each such cell is ultimately determined by applying the planned power, path imbalance, and handoff parameters to the test data which has been accumulated.

Once the cells serving all of the points of a service area are known, the group of channel proposed for each of the cells or sectors is associated with those cells. When the channels for each cell are known, the signal strength provided by each cell which is the server at each test position in the cellular system is compared with the signal strengths of all cells transmitting signals received at each test position which transmits on channels which could cause co-channel or adjacent channel interference. This allows a determination of whether the proposed channel selection causes either co-channel or adjacent frequency interference at any point in the system. Since the points at which signals on any particular channel transmitted by one cell will have a certain strength and may interfere with signals from another cell may be determined from the signal strength data which has been collected, such a determination may be made for each proposed point and channel in the system. Whether a signal will interfere is usually determined by subtracting the interfering signal strength in dBm from the signal strength of the carrier signal serving the point in dBm at each point. The cells which are likely servers at each point have already been determined from the test to determine cells serving a point. For co-channel interference in the AMPS system, if the difference is less than 18 dB, interference exists. For adjacent channel interference in the AMPS system, if the difference is less than from 3 to 6 dB. (depending on the criteria used), interference exists. If there is interference at any point in the system, the pattern of channel assignments and other cell configuration information (such as effective radiated power (ERP)) may be changed; and the actual signal strength database may be run against the new cell channel assignments. This requires no new testing or other operations by the operator; it requires simply running the software until channel selections which exclude interference are determined.

Not only may the process be used to update or plan a new system, the process also allows signal strength measurements derived from drive tests conducted using a particular type of cellular system such as an AMPS to be used for determining coverage and interference patterns for cell sites utilized by entirely different types of systems. This has the advantage of allowing drive test results accumulated from an older system to be used to predict interference which may occur in newer types of systems which might be installed at the same sites. The same signal strength test results may be utilized as a system is changed in any manner. In a similar manner, if an operator has already established CDMA channels from which the strength of signals may be discerned, it is possible to use this data to optimize the performance of the AMPS channels which exist at the same cell site. An additional benefit is that the CDMA measurement process is non-invasive so that the operator does not have to "key-up" channels for testing to derive data.

In an AMPS system, the new channel assignments may be tested by the software against the signal strength measurement database to derive new predictions of interference. If additional cells or sectors are to be added, this may be accomplished by drive tests for signals from the new cells only. These may be added to the signal strength measurement database and the updated database used to determine new channels to be used.

It has now been determined that this process may be made substantially more useful by modifying the process to provide consistent values which indicate just how the various points, sectors, and cells in the system, and the system itself compare with other points, sectors, cells, and systems. Such a value is more readily understood by system operators and allows changes to be planned with an understanding of the result which will be accomplished by those changes.

In order to generate values which have meanings which remain consistent wherever they are determined, the improved process relates not only the strengths of carrier signals and signals which interfere with those carrier signals but also determines the probability of occurrence of the various interfering signals and the severity of the interference during receipt of the interfering signal. This allows an interference value to be determined which essentially indicates the percentage of time a subscriber to a mobile system may expect to encounter perceptible interference at any point in the system. Moreover, the interference values for points within a sector, cell, and system may be accumulated and averaged in the manner described in FIG. 4 to provide an interference value for sectors, cells, and the system. This allows an operator to pinpoint sectors and cells which need to be improved and provides an overall evaluation of a system from which an operator may determine rationally whether improvements need to be made. Using the interference values for points in a system, the efficacy of each change to the system may be evaluated as it is proposed. Each type of change which might be made may be compared to other types of changes in order to make the most economical changes possible.

To understand how a consistent interference value may be derived, the process of interference has been dissected to determine its elements. For example, if it is possible that three different signals may interfere with a particular signal from a base station which is a most likely server, then the actual likelihood of each of these signals interfering can be considered in order to better understand how receipt of signals at that point compare with receipt of signals at other points and thus to have an idea on how to improve a system. This is accomplished by the use of a probability number assigned to each of the different interfering signals determined from the traffic patterns and other factors known (or estimated) to occur for the particular base stations. A cell in an area having more traffic transmits during a greater portion of the time spectrum.

Figure 3:
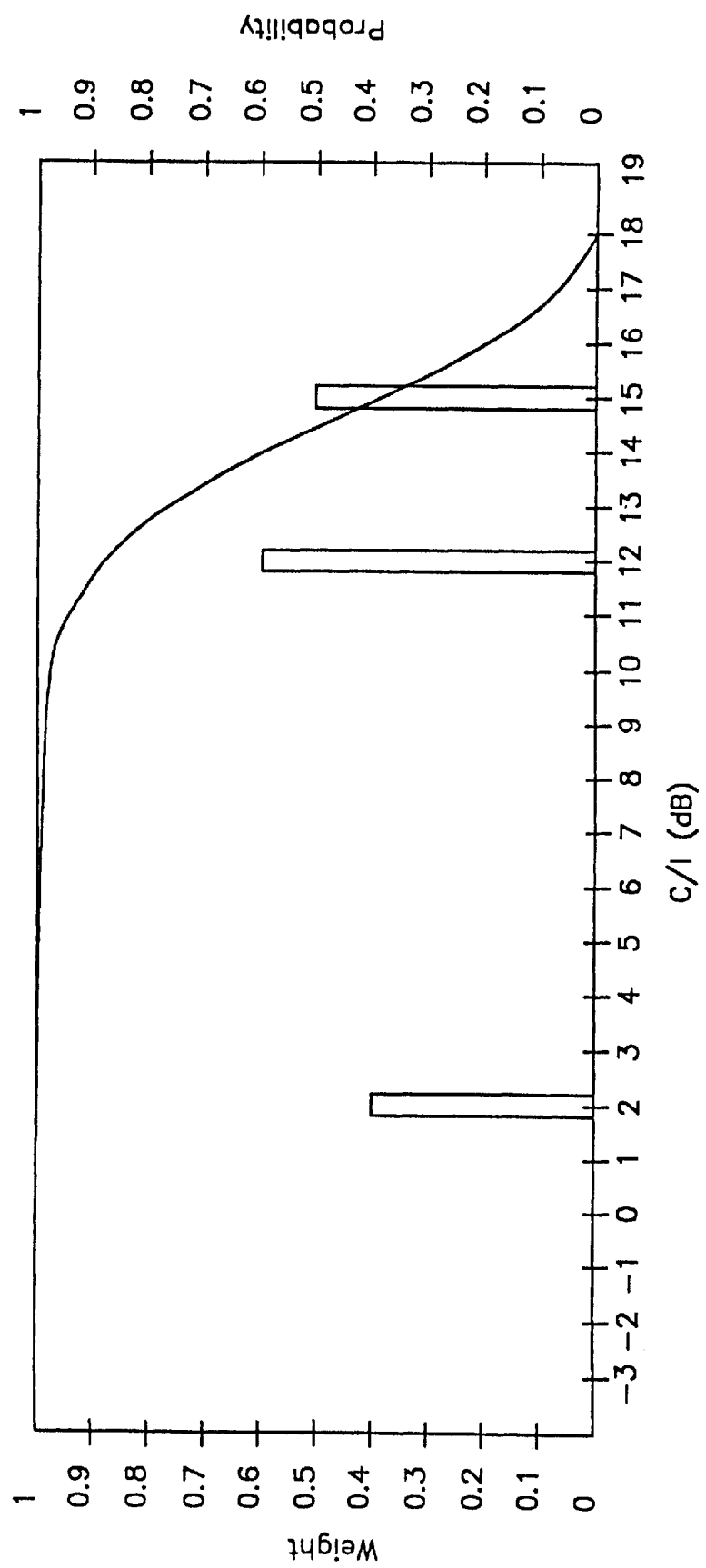
FIG. 3 is a graphical view illustrating the effect of signals interfering with carrier signals useful in understanding the method of the invention.

FIG. 3 illustrates a plot of co-channel interference ratios (carrier strength of signal from a primary server divided by signal strength of a co-channel signal received) versus the effect those ratios have on transmission of a carrier signal in an AMPS system. The effect is shown as a weight value which indicates the severity of the interference. As may be seen, if the co-channel interference is great enough so that the difference in signal strength is less than approximately 10 dB, then the interference is too great for any useful transmission. Such an interference level is given a weight of one. On the other hand, if the signal strength of a carrier signal is more than 18 dB greater than the signal strength of the interfering co-channel, then the effect on the transmission is nil; and a weight of zero is given. Between these values, the interfering signal has greater and lesser effects as may be seen from the figure.

In one embodiment of the invention, the presumption is made that if two or more signals may possibly interfere with a carrier at any point in the system, the effect of the stronger interfering signal will negate any effect that the weaker signals may have during time the stronger signal is being received. Although this is an approximation, its use has little affect on the accuracy of the results produced. The use of this presumption means that only the stronger interfering signal need be considered at any time. Thus, to determine the overall effect of three interfering signals, the probability of the occurrence of each signal is determined and then multiplied by the weight value to determine the effect that signal has. For example, a strongest interfering signal within 10 dB of the carrier has the weight one (indicating that the carrier signal is entirely obscured during transmission of the interfering signal) multiplied by the probability of occurrence. Thus for the 2 dB signal shown in FIG. 3, its probability is 0.4; and its effect is obtained by multiplying this probability by the weight of one.

Once the effect of the strongest interfering signal has been determined, its probability of transmission is subtracted from one to provide the probability that the first interfering signal is not active. The result of this computation provides the time range within which the second strongest interfering signal occurring will have significant effect. Thus, the probability that the second strongest signal of 12 dB will interfere is the probability factor 0.6 of the second signal occurring multiplied by the time during which it will have significant influence (0.6 of the total time). This probability for the second signal is multiplied by its weight of 0.84 to determine its effect. The probability that the third signal of 15 dB will interfere is determined by multiplying the probability that the first interfering signal is not active by the probability that the second interfering signal is not active by the probability factor for the third signal occurring. This probability factor is then multiplied by the weight of 0.32 for the third signal to reach an effect for the third signal.

Adding the effect of all of these signals interfering provides a final result of 0.7408 which may be stated as a percentage and provides a quality number for the particular point in the system with the planned channels and parameter settings. In essence, the interference value indicates the percentage of time interference will be present at the point. Obviously, the value of 74% indicates that receipt of signals at the particular point is almost impossible. This interference or quality value may be compared with interference values for all other points in a service area.

Figure 4:
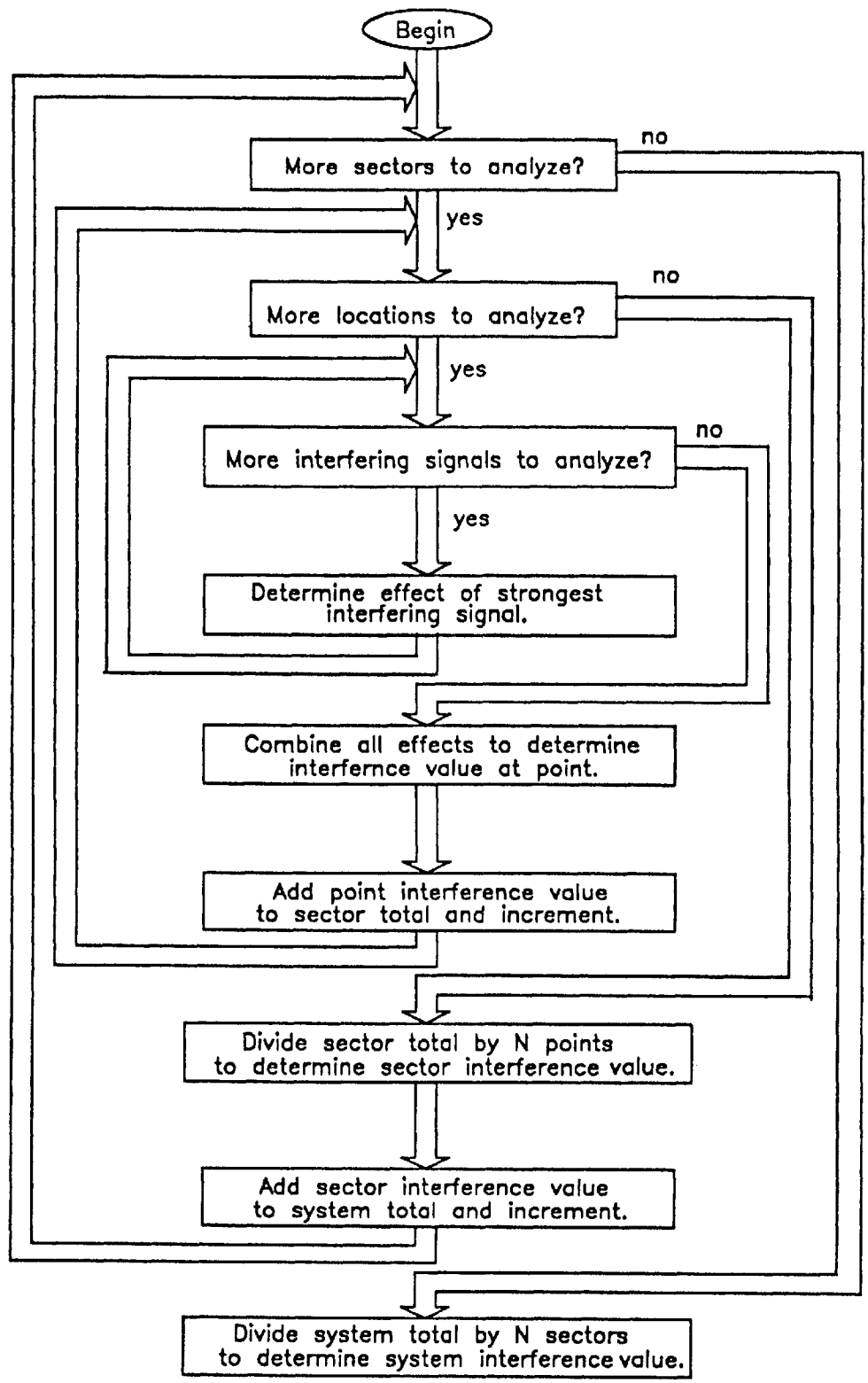
FIG. 4 is a flow chart illustrating a portion of a process in accordance with the present invention in a system such as that illustrated in FIG. 1.

Once a quality value for a point has been obtained, quality values are obtained for some number of additional points in the sector sufficient to provide a relatively good evaluation of all of the places in the sector at which communications may be received. The quality values obtained for a sector are then added together and divided by their number to obtain an average quality value for the sector (or cell). FIG. 4 illustrates the method by which this is accomplished, finding first an interference value for a point, then a next point, and so on until the points for a sector are all determined. Then all sectors values are determined and finally a sector score is reached.

Similarly, once the quality value for one sector has been obtained, quality values for all sectors in a system may be similarly obtained, added together and averaged to provide a quality score for the entire system. This score may then be utilized to determine whether the system should be changed in order to provide improved service. Utilizing a quality value which is consistently applied from point-to-point, sector-to-sector, and system-to-system allows a valuation to be made from which some real determination of quality may be made.

More specifically, if a quality valuation for a sector is known, it is possible to determine whether changes which might be attempted in the system would be successful. That is, different changes to a particular sector may be assigned different quality increments by testing to determine the effect those changes might have. For example, changing the power level of an interfering signals from another sector can clearly be ascribed an increment since the level of signal received is an exact value in reaching the original interference level. With an incremental value to be applied for a change to the sector, it may be known before any change is made whether that change will provide an improvement in the sector and system quality.

Figure 5:
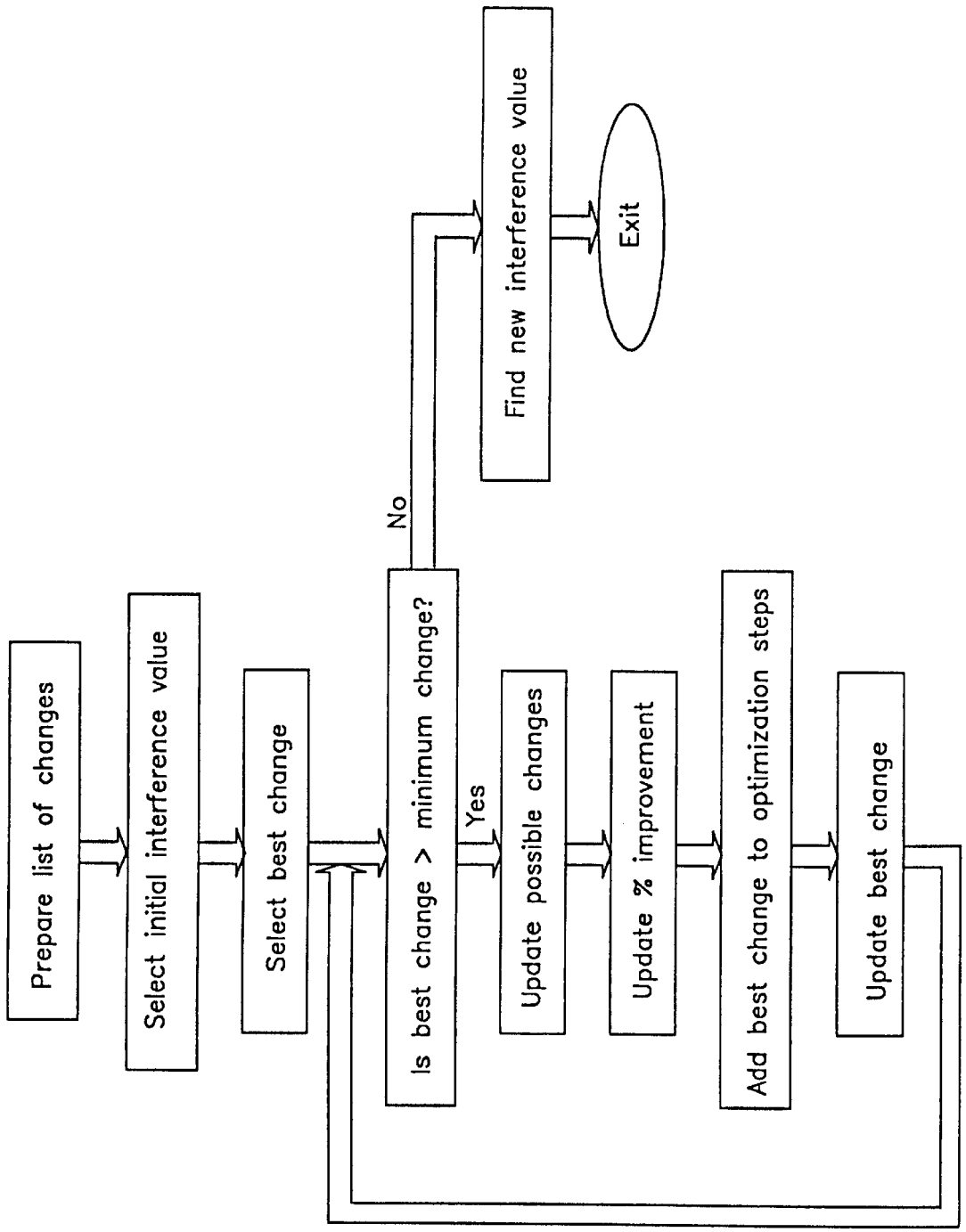
FIG. 5 is flow chart illustrating another portion of a process in accordance with the present invention in a system such as that illustrated in FIG. 1

FIG. 5 is a flow chart which illustrates the operation of the method to improve the quality of a system once a quality value for the sectors and a system are found and the values of possible changes are known. As may be seen, the method begins with the original interference value for a point, and selects a best change to improve the quality of service for the point. Often when beginning to improve a system, this best change is a change in the group of frequencies assigned to one or more sectors (or cells). Probably the next change to be made once appropriate frequency groups have been chosen, is to change power settings of transmitters. Biasing the level of handoff so that the handoff occurs if two channels are within two, three, or four dB of one another in a handoff area changes the point at which handoff occurs and the level of power necessary in those areas. Other changes which are possible include changing antenna types, and other changes related to equipment modification.

The method illustrated in FIG. 5 may be used in more than one manner. It may be used to iterate through changes of one type (e.g., change the frequency assignments) computing each result as it is implemented in software until an interference value is reached which is the best that that form of change can accomplish. Alternatively, it may be used to select among different types of changes to determine which provides a better result when compared to the cost of implementing the change.

Presuming for the moment that the change is an iteration through a selection of possibilities of one type (frequency groups) until a best result is reached, a list of changes is prepared by comparing the interference levels at each point to determine which frequencies interfere with one another. A particular change is selected from the list of possible changes, and a determination is made by running the software whether the change produces a result greater than some value so that the change is worth undertaking for the improvement to be expected. When testing different frequency groups, the change making the process worth while may be a reduction of some percent (e.g., one percent) in the interference value. Changing frequency groups, changing power levels, or biasing the handoff level differently usually costs nothing but processing time and is worth while if it produces a concrete result. Other changes may require new equipment and be more expensive, however.

If the change contemplated does not produce an improvement sufficient to warrant its use, the change may be thrown out and a final interference value determined. If the change is worth making, the list of changes is updated to show that the particular change has been evaluated and the amount of change is listed in a list of changes. The change is added to a list of changes to make as a best change if it is the first or best tested. It is also listed as the best change to make. The process then iterates through the list and for each change above the minimum change which is worth while, updates the list of possible changes by removing the tested changes from the list of those changes still to be tested, recording the change value, adding the change to the optimization steps if its effect is greater than preceding changes, and replacing the best change with the latest change if the result is correct. Ultimately, the best change to be made for the particular point is reached. A similar process occurs for all other points in the system. Ultimately, a result for changing the particular factor that produces the best result for each sector and the system is reached.

The method may then proceed with any other changes which might implemented to improve the system. The same iterative method may be used to determine a best change of the particular type for each point, sector, cell, and the system.

Alternatively, different types of changes may be given different weightings and the entire process carried out for each point with respect to all of the possible changes to determine which changes should be implemented to produce the best results.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A process for optimizing the performance of a wireless communication system, comprising the steps of:

for each of a number of sector signals:
measuring a received signal strength of said sector signal at a plurality of measurement points within the bounds of a test region;
for each of said plurality of measurement points, averaging the values of said received signal strength, for said sector signal, measured at a number of the closest measurement points, to the measurement point under consideration, with the value of said received signal strength, for said sector signal, measured at the measurement point under consideration;

for each of said plurality of measurement points within the bounds of a test region:
determining a likely server sector based upon the relative values of said number of averaged received signal strengths for said measurement point;
determining a number of likely interferer sectors based upon the relative values of said number of averaged received signal strengths for said measurement point; and
for each individual one of said number of likely interferer sectors, calculating a product obtained by multiplying an estimate of said individual sector's likelihood of transmission by a weighting value indicating the relative value of said individual sector's average signal strength to said likely server sector's average signal strength;
determining a weighted probability that at least one of said number of likely interferer sectors will be active at some time, by mathematically combining said calculated products; and ascribing said weighted probability as a magnitude of measurement point interference.

2. A process for optimizing the performance of a wireless communication system, comprising the steps of:

for each of a number of measurement points within the bounds of a test region:

determining a likely server sector based upon the relative values of a number of signal strength measurements made at said measurement point;

determining a number of likely interferer sectors based upon the relative values of said number of signal strength measurements made at said measurement point; and for each individual one of said likely interferer sectors, calculating a product obtained by multiplying an estimate of said individual sector's likelihood of transmission by a weighting value indicating the relative value of said individual sector's signal strength measurement to said likely server sector's signal strength measurement;

determining a weighted probability that at least one of said number of likely interferer sectors will be active at some time, by mathematically combining said calculated products; and ascribing said weighted probability as a magnitude of measurement point interference.

3. The process of claim 2, further comprising the step of:

for each individual one of a number of server sectors within the bounds of said test region, determining an individual sector interference value by:

calculating a sector interference sum by summing said measurement point interference values for all of said number of measurement points having a common likely server sector; and dividing said sector interference sum by the number of said measurement point interference values summed.

4. The process of claim 3, further comprising the step of:

determining a system interference value by:

calculating a system interference sum by summing said individual sector interference values for all of said number of server sectors within the bounds of said test region; and dividing said system interference sum by the number of said individual sector interference values summed.

* * * * *